Oct. 6, 1964 S. C. POLLOCK 3,151,698
MOTOR VEHICLE SAFETY CONTROL SYSTEM
Filed Sept. 28, 1962 2 Sheets-Sheet 1

INVENTOR.
Samuel C. Pollock
BY
Paul J. Ethington
ATTORNEY

INVENTOR.
Samuel C. Pollock
BY
Paul J. Ethington
ATTORNEY

United States Patent Office 3,151,698
Patented Oct. 6, 1964

3,151,698
MOTOR VEHICLE SAFETY CONTROL SYSTEM
Samuel C. Pollock, Rochester, Mich., assignor to General Motors Corporation, Detroit, Mich., a corporation of Delaware
Filed Sept. 28, 1962, Ser. No. 227,013
6 Claims. (Cl. 180—82)

This invention relates to motor vehicle safety control systems and more particularly to a system for automatically controlling both the vehicle ignition system and an electrically operated device mounted in the motor vehicle under predetermined conditions of vehicle operation. While of general utility, the subject control system is particularly useful in controlling the operation of an electrical door locking mechanism.

In accordance with this invention, means are provided for automatically locking the vehicle doors whenever the vehicle is subjected to an accelerating force above a predetermined amount such as by sudden starting or stopping or in the event of a collision. This is accomplished by connecting, in the circuit for actuating the door-locking mechanism, an omnidirectional acceleration responsive switch which will close when a predetermined acceleration is reached. In addition, this invention provides means for automatically de-energizing the vehicle ignition system and deactivating the door-locking mechanism whenever the vehicle has assumed a stationary attitude greater than a predetermined degree of inclination from the normal attitude of the vehicle. This is accomplished by connecting a tilt responsive mercury switch in series with the parallel circuits comprising respectively the ignition system and the acceleration responsive switch. This feature of the invention greatly reduces the possibility of fire should the vehicle turn over after a collision since it is in this position that gasoline will escape from the fuel tank and carburetor.

Figure 1:
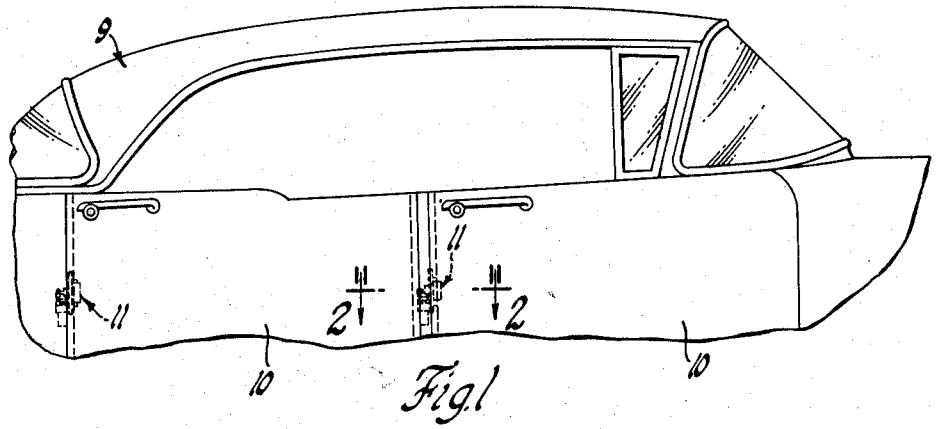
Figure 2:
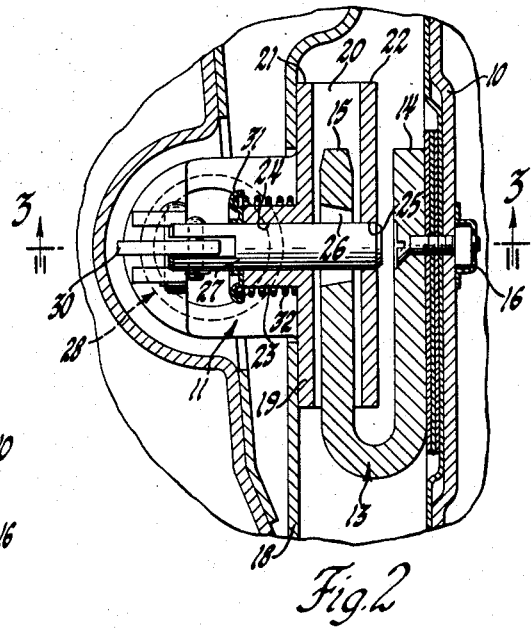
Figure 3:
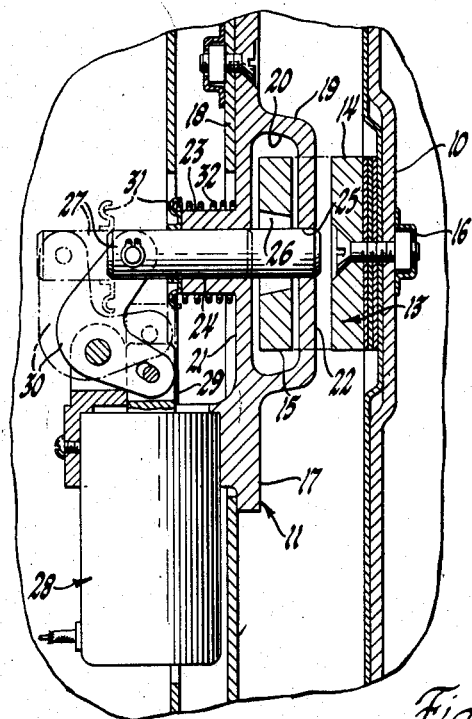
Figure 4:
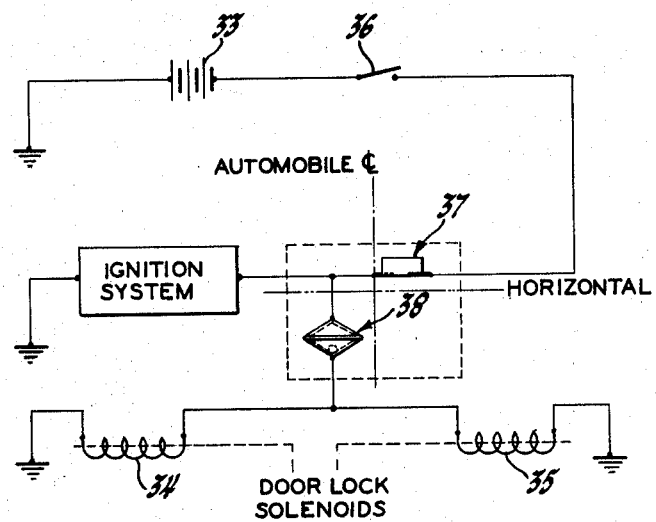
Figure 5:
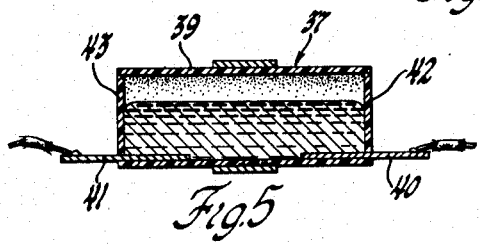
Figure 6:
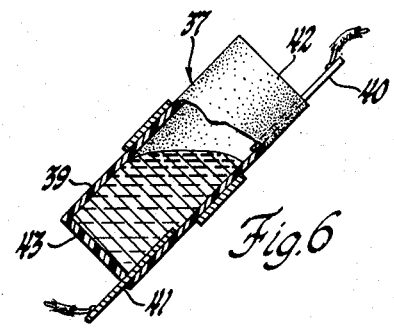
Figure 7:
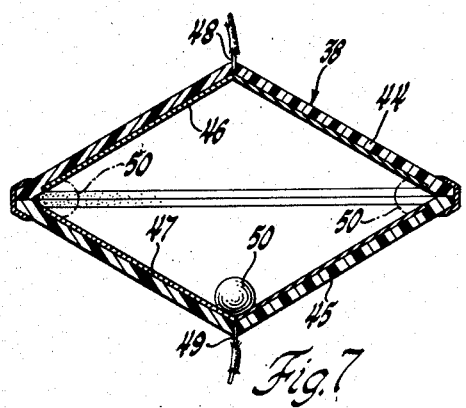
Figure 8:
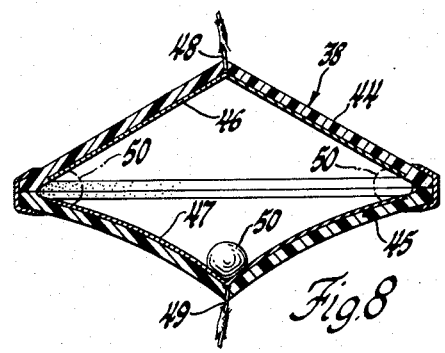

A more complete understanding of the invention may be had from the detailed description which follows taken from the accompanying drawings in which:

FIGURE 1 is a general view showing an automobile in outline;
FIGURE 2 is a sectional view taken along lines 2—2 of FIGURE 1;
FIGURE 3 is a sectional view taken along lines 3—3 of FIGURE 2;
FIGURE 4 is a circuit diagram of the safety control system;
FIGURE 5 is a sectional view of the normally closed tilt responsive switch used in the present invention;
FIGURE 6 is a sectional view of the normally closed tilt responsive switch shown in a tilted position;
FIGURE 7 is a sectional view of the inertia switch used in the present invention; and
FIGURE 8 is a sectional view of a modification of the inertia switch used in the present invention.

Referring to the accompanying drawings wherein like reference numerals designate similar parts throughout the various views, an automobile generally designated by the numeral 9, is provided with the usual front and rear doors 10. A locking mechanism, indicated generally by the numeral 11, is provided for locking and unlocking the doors 10 in response to predetermined conditions of motor vehicle operation.

Referring to FIGURES 2 and 3, the door locking mechanism 11 is shown to include a U-shaped keeper member 13 having first and second arm portions 14 and 15. Arm portion 14 is secured to the door 10 in any suitable manner, as by nut and bolt assembly 16. A supporting member 17 is secured to the door pillar 18 and has a portion 19 provided with an opening 20 for receiving the arm portion 15. Opening 20 is bounded by side walls 21 and 22. A boss 23 extends outwardly from the wall 21 and has an axial bore 24 formed therethrough. Opposite wall 22 is provided with an aperture 25 which is axially aligned with bore 24 in the boss 23.

Arm portion 15 has an opening 26 which is aligned with the bore 24 when the door 10 is closed. A locking bolt 27 extends axially through the boss 23 and reciprocates in the bore 24. In the locked position, the bolt 27 extends through the boss 23, through the opening 26 in the arm 15, and through the axially aligned aperture 25 in the wall 22.

The door locking mechanism 11 is actuated by a solenoid, indicated generally by the numeral 28. The solenoid has a plunger 29, one end of which is operatively connected to the locking bolt 27 in some suitable manner, as by bell crank 30. Solenoid 28 may be energized to move the locking bolt 27 into the locked position. A spring seat 31 is secured to the locking bolt 27 and engages suitable spring 32 surrounding the boss 23 and abutting the wall 21 of the supporting member 17. Spring 32 is operative to return the locking bolt 27 to the unlocked position when the solenoid is de-energized.

FIGURE 4 depicts a circuit diagram showing the arrangement of the components of the present invention. A battery 33 is connected across the solenoid windings 34 and 35 through an ignition switch 36, a tilt responsive switch 37 and an inertia switch 38. The ignition system is connected in series with the tilt responsive switch 37 and in parallel with the inertia switch 38 and the solenoid windings 34 and 35.

The tilt responsive switch 37 is more clearly shown in FIGURE 5 and comprises a cylindrical housing 39 with end portions 42 and 43. The housing 39 is formed of an insulating material, such as plastic or glass. A pair of spaced electrodes 40 and 41 extend through the end portions 42 and 43, respectively. The housing 39 is substantially half filled with mercury which bridges the electrodes 40 and 41 when the switch is in its normal position thereby completing the circuit to the ignition system and to the inertia switch 38. The amount of mercury contained in the housing relative to the size of the housing and the spacing of the electrodes is such that momentary agitation of the mercury will not open the circuit. The ignition circuit will only open when the vehicle has come to rest at a predetermined degree of inclination of the automobile as shown in FIGURE 6.

The inertia switch is more clearly shown in FIGURE 7 and comprises a housing having upper and lower conical shaped insulating members 44 and 45 joined together in sealing relationship. Spaced upper and lower conical shaped conducting surfaces 46 and 47 are embedded in the housing and have terminals 48 and 49 connected therewith which extend through the conical shaped insulating members 44 and 45, repsectively. A bead of mercury 50 is freely movable within the housing and when the switch is in the normal position is located in the bottom of the lower conducting surface 47. During normal operation, the conducting surfaces 46 and 47 are open and prevent current flow to the solenoids. In the event the switch is subjected to a predetermined amount of accelerating force, the bead of mercury 50 will move from its open position in the bottom of the lower cone to a position where it closes the circuit between the two conducting surfaces as shown by the dotted lines in FIGURE 7.

The sensitivity of the inertia switch 38 may be controlled by modifying the lower cone as shown in FIGURE 8. By making the walls of the lower cone concave, the switch will have greater stability in both the on and off conditions.

The operation of the system is as follows:

With the automobile resting at a degree of tilt less than the predetermined maximum, current may be supplied from the battery 32 through the ignition switch 36 and the normally closed tilt responsive switch 37 to the ignition system to start the automobile. At this time, no current is supplied to the solenoid windings since the contacts of the inertia switch 38 are open. If the automobile is now rapidly accelerated or decelerated beyond a predetermined value, or by the occurrence of a collision, the contacts 46 and 47 of the inertia switch 38 will be bridged by the mercury bead 50 to energize the solenoid windings 34 and 35 and automatically lock the doors 10. The locking mechanism 11 will automatically release when the acceleration force is dissipated. If the automobile should be involved in a collision and come to rest on one of its sides, the inertia switch 38 would close and energize the solenoid windings 34 and 35; however, under these conditions, the tilt responsive switch 37 would open and de-energize the solenoid windings 34 and 35 to unlock the doors and thereby facilitate passenger escape. The opening of the tilt responsive switch 37 also de-energizes the ignition system killing the engine and thereby minimizing the possibility of gasoline explosion.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

I claim:

1. In combination with a motor vehicle having a door-locking mechanism actuated by a solenoid, a safety control system comprising a source of electrical power connected across said solenoid through an ignition switch, tilt responsive switch and an inertia switch, an automobile ignition system connected across said source in series with the said ignition switch and said tilt responsive switch and in parallel with said inertia switch and said solenoid, whereby said solenoid is energized by the closing of said inertia switch when said inertia switch is subjected to an accelerating force above a predetermined amount and whereby said solenoid and said ignition system is de-energized when said motor vehicle assumes a stationary attitude greater than a predetermined degree of inclination from the normal attitude of said motor vehicle.

2. In combination with a motor vehicle having a door-locking mechanism actuated by a solenoid, a safety control system for energizing said solenoid comprising a source of electrical power connected across said solenoid through an ignition switch and an inertia switch, said inertia switch comprising a housing having upper and lower generally conical shaped members joined together in sealing relationship, spaced upper and lower conical shaped conducting surfaces enveloped by said housing, said surfaces having terminals for connecting said surfaces to said inertia switch and said solenoid, a bead of mercury freely movable within said housing and normally resting in the bottom of said lower conducting surface, said spaced conducting surfaces adapted to be connected by said bead of mercury when said inertia switch is subjected to an accelerating source above a predetermined amount.

3. In combination with a motor vehicle having a solenoid actuated emergency locking mechanism for locking and unlocking each of the doors of said motor vehicle upon the occurrence of predetermined conditions, a safety control system comprising a battery having a positive and negative terminal, a first and second switch supported by the frame of said motor vehicle, said first switch being a normally closed mercury switch having a cylindrical closed housing of insulating material and having first and second electrodes extending respectively through the ends of said cylindrical housing, said housing containing mercury which bridges said electrodes at all times except when said motor vehicle has assumed a stationary attitude greater than a predetermined degree of inclination from the normal attitude of said motor vehicle, an ignition switch connected to said positive terminal and to said first electrode, said second switch being a normally open mercury switch comprising, in cross-section, a diamond shaped housing, spaced upper and lower conical shaped conducting surfaces enveloped by said housing, said surfaces having first and second terminals extending through said housing, said first terminal being connected with said second electrode, a bead of mercury freely movable within said housing and normally resting in the bottom of said lower conducting surface, said spaced conducting surfaces adapted to be connected by said bead of mercury when said second switch is subjected to an accelerating force above a predetermined amount, a plurality of solenoids having one terminal connected to said second terminal of said second switch and having a second terminal connected to ground, a motor vehicle ignition system comprising an ignition coil connected to said second terminal of said first switch and to ground whereby said solenoids and said ignition system is open-circuited when said motor vehicle assumes said stationary attitude.

4. In combination with a motor vehicle having a door locking mechanism, a safety control system comprising a source of power, means connected across said source for actuating said door mechanism, impact means and tilt responsive means connected in series between said source and said actuating means whereby said actuating means is energized when said vehicle is subjected to impact and is deenergized when said motor vehicle assumes a stationary attitude of predetermined inclination with respect to the normal attitude of said motor vehicle.

5. In combination with a motor vehicle having a door locking mechanism and an ignition system, a safety control system comprising a source of power, a tilt responsive switch connecting said ignition system across said source, actuating means for actuating said door mechanism, an omnidirectional acceleration responsive switch connecting said actuating means in series with said tilt responsive switch whereby said actuating means is energized when said motor vehicle is subjected to an accelerating force above a predetermined amount and whereby said actuating means and said ignition system are deenergized when said motor vehicle assumes a stationary attitude greater than a predetermined degree of inclination from the normal attitude of said motor vehicle.

6. A motor vehicle safety control system comprising a source of power, a vehicle ignition system, a tilt responsive switch connecting said ignition system across said source, an electrically operated device mounted in said motor vehicle, an acceleration responsive switch connecting said device in series with said tilt responsive switch whereby said device is energized when said motor vehicle is subjected to an acceleraton force above a predetermined amount and whereby said device and said ignition system are de-energized when said motor vehicle assumes a stationary attitude greater than a predetermined degree of inclination from the normal attitude of said motor vehicle.

References Cited in the file of this patent

UNITED STATES PATENTS

| | | |
|---|---|---|
| 1,915,267 | Bigelow | June 27, 1933 |
| 2,099,483 | Hinde | Nov. 16, 1937 |
| 2,189,748 | Wilson | Feb. 6, 1940 |
| 2,276,019 | Ching | Mar. 10, 1942 |
| 2,304,608 | Smythe | Dec. 8, 1942 |
| 2,313,549 | Hornain | Mar. 9, 1943 |